US008938588B2

(12) United States Patent
Cox et al.

(10) Patent No.: US 8,938,588 B2
(45) Date of Patent: Jan. 20, 2015

(54) ENSURING FORWARD PROGRESS OF TOKEN-REQUIRED CACHE OPERATIONS IN A SHARED CACHE

(75) Inventors: Jason A. Cox, Raleigh, NC (US); Eric F. Robinson, Raleigh, NC (US); Mark J. Wolski, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 12/969,617

(22) Filed: Dec. 16, 2010

(65) Prior Publication Data
US 2012/0159087 A1 Jun. 21, 2012

(51) Int. Cl.
G06F 12/00 (2006.01)
G06F 12/08 (2006.01)

(52) U.S. Cl.
CPC .......... G06F 12/0833 (2013.01); G06F 12/084 (2013.01)
USPC ........................................... 711/146; 711/156

(58) Field of Classification Search
USPC .......................................... 711/145, 146, 156
See application file for complete search history.

(56) References Cited

U.S. PATENT DOCUMENTS

| 5,906,001 | A | 5/1999 | Wu et al. |
|---|---|---|---|
| 6,079,013 | A | 6/2000 | Webb et al. |
| 6,247,025 | B1 | 6/2001 | Bacon |
| 6,480,915 | B1 | 11/2002 | Arimilli et al. |
| 6,728,800 | B1 | 4/2004 | Lee et al. |
| 2006/0190510 | A1* | 8/2006 | Gabryjelski et al. .......... 707/206 |

* cited by examiner

Primary Examiner — Kalpit Parikh
(74) Attorney, Agent, or Firm — Edward J. Lenart; H. Daniel Schnurmann; Biggers Kennedy Lenart Spraggins LLP

(57) ABSTRACT

Ensuring forward progress of token-required cache operations in a shared cache, including: snooping an instruction to execute a token-required cache operation; determining if a snoop machine is available and if the snoop machine is set to a reservation state; if the snoop machine is available and the snoop machine is in the reservation state, determining whether the instruction to execute the token-required cache operation owns a token or is a joint instruction; if the instruction is a joint instruction, instructing the operation to retry; if the instruction to execute the token-required cache operation owns a token, dispatching a cache controller; determining whether all required cache controllers of relevant compute nodes are available to execute the instruction; executing the instruction if the required cache controllers are available otherwise not executing the instruction.

27 Claims, 2 Drawing Sheets

US 8,938,588 B2

ENSURING FORWARD PROGRESS OF TOKEN-REQUIRED CACHE OPERATIONS IN A SHARED CACHE

BACKGROUND OF THE INVENTION

1. Field of the Invention

The field of the invention is data processing, or, more specifically, methods, apparatus, and products for ensuring forward progress of token-required cache operations in a shared cache.

2. Description of Related Art

Modern computing systems include a plurality of resources that operate to carry out many functions. One resource contained in modern computing systems is computer memory. Computer memory can come in many forms such as disk storage, memory modules, and processor level memory in the form of cache. Caches are often broken up into multiple levels, such an L1 cache, L2 cache, and so on. Operations that make use of such cache will, at times, need to be executed one operation at a time to avoid misuse of the cache.

SUMMARY OF THE INVENTION

Methods, products, and apparatus for ensuring forward progress of token-required cache operations in a shared cache, including: snooping, by a snooper in a cache controller in a shared cache level, an instruction to execute a token-required cache operation that owns a token or an instruction that is a joint instruction that includes a request for a token and the token-required cache operation for execution; determining, by the snooper, if a snoop machine is available and if the snoop machine is set to a reservation state, wherein the reservation state indicates that the snoop machine will dispatch the cache controller to handle only token-required cache operations that own a token; if the snoop machine is available and the snoop machine is in the reservation state, determining whether the instruction to execute the token-required cache operation owns a token or is a joint instruction; if the instruction is a joint instruction, instructing the instruction to retry; if the instruction to execute the token-required cache operation owns a token, dispatching the cache controller that includes the snoop machine to execute the token-required cache operation; determining, by the cache controller, whether all required cache controllers of relevant compute nodes are available to execute the instruction and executing the instruction if the required cache controllers are available; and if all required cache controllers of the relevant compute nodes are not available to execute the instruction, not executing the instruction.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
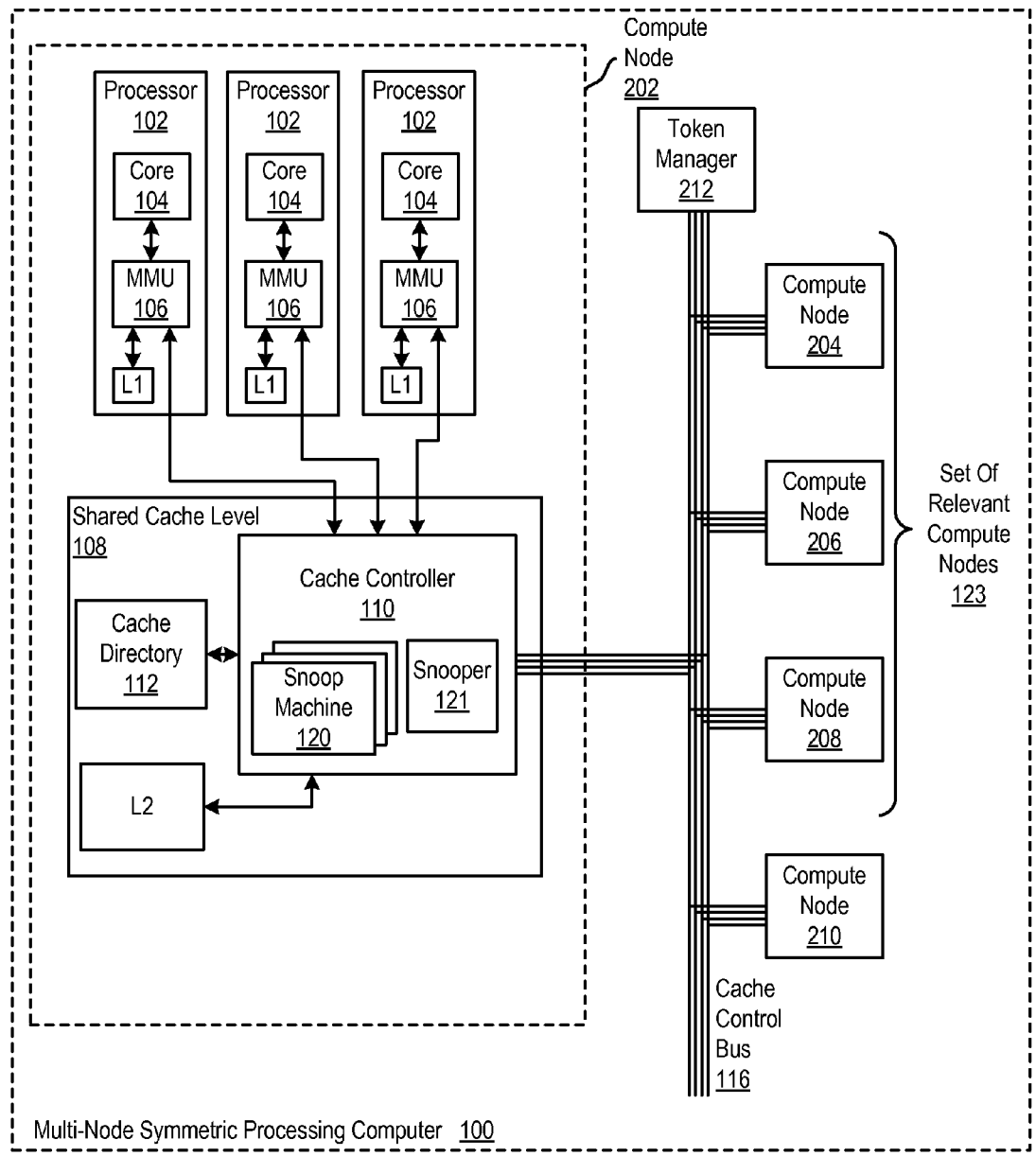
FIG. 1 sets forth a functional block diagram of an example of a multi-node, symmetric multiprocessing computer that ensures forward progress of token-required cache operations in a shared cache according to embodiments of the present invention.

Example methods, apparatus, and products for ensuring forward progress of token-required cache operations in a shared cache in accordance with the present invention are described with reference to the accompanying drawings, beginning with FIG. 1. FIG. 1 sets forth a functional block diagram of an example of a multi-node, symmetric multiprocessing computer (100) that ensures forward progress of token-required cache operations in a shared cache according to embodiments of the present invention.

The example computer (100) of FIG. 1 includes several compute nodes (202, 204, 206, 208, 210). Actually the example of FIG. 1 illustrates a computer (100) with five compute nodes, but this number five is only for ease of explanation, not for limitation of the invention. Readers will recognize that SMP computers that ensure forward progress of token-required cache operations in a shared cache according to embodiments of the present invention can have any number of compute nodes. The IBM System z10™ series of mainframe computers, for example, each can include up to 64 compute nodes or, in z10 terminology, "frames." The IBM Blue Gene™ series of supercomputers can support thousands of compute nodes.

The diagram of one of the compute nodes (202) is expanded to illustrate the structure and components of an example compute node. Each compute node need not be the same. Some compute nodes may perform the same function as the example compute node (202) while others may not. Each compute node (202, 204, 206, 208, 210) includes a number of computer processors (102). The example compute node (202) includes three computer processors (102), but this is for ease of explanation, not for limitation. Readers will recognize that each compute node can include any number of computer processors as may occur to those of skill in the art. The compute nodes in the IBM System z10 series of mainframe computers, for example, each can include up to 64 processors.

Each processor (102) in the example of FIG. 1 includes a compute core (104) that is coupled for memory operations through a memory management unit ('MMU') (106) and a cache controller (110) to two caches L1 and L2. L1 is a relatively small, high speed cache fabricated into the processor itself. The MMU (106) includes address translation logic, a translation lookaside buffer, controls for the on-processor cache L1, and so on. The cache controller (110), with the L2 cache, a cache directory (112), and a cache control bus (116) bearing data communications among the compute nodes according to a cache coherency protocol, implements a shared cache level (108) across the nodes (202, 204, 206, 208, 210) of the computer.

The caches L1 and L2 are specialized segments of memory used by the processors (102) to reduce memory access latency. Each cache is smaller and faster than main memory, and each cache stores copies of data from frequently used main memory locations. When a processor needs to read from or write to a location in main memory, it first checks whether a copy of that data, a "cache line," is in a cache. If so, the processor reads from or writes to the cache, which is much faster than reading from or writing to main memory. As long as most memory accesses are cached memory locations, the average latency of memory accesses will be closer to the cache latency than to the latency of main memory. As mentioned, main memory is much slower than any cache, and cache misses extract a heavy toll in memory access latency.

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in main memory.

In the example of FIG. 1, caches L1 and L2 implement a multi-level cache with two levels. Multi-level caches address the tradeoff between cache latency and hit rate. Larger caches have better hit rates but longer latency. To address this tradeoff, many computers use multiple levels of cache, with small fast caches backed up by larger slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. Many computers implement additional levels of cache, three or even four cache levels. Some processors implement as many as three levels of on-chip cache. For example, the Alpha 21164™ has a 96 KB on-die L3 cache, and the IBM POWER4™ has a 256 MB L3 cache off-chip, shared among several processors. In the example of FIG. 1, the L2 cache is shared directly among the processors on a compute node and among processor on all compute nodes through cache controller (110) on each node and the cache control bus (116).

The cache directory (112) is a repository of information regarding cache lines in the caches. The directory records, for each cache line in all of the caches on a compute node, the identity of the cache line or cache line "tag" and the cache line state, MODIFIED, SHARED, INVALID, and so on. The MMUs (106) and the cache controllers (110) consult and update the information in the cache directory with every cache operation on a compute node. The cache controller (110), connected directly to L2, has no direct connection to L1—and obtains information about cache lines in L1 from the cache directory (112).

The cache controller (110) is a logic circuit that manages cache memory, providing an interface among processors (102) and caches. Although the cache controller (110) here is represented externally to the processors (102), cache controllers are often integrated on modern computers directly into a processor or an MMU. In this example, the MMUs (106) in fact include cache control logic for the L1 caches. In the example of FIG. 1, the cache controller (110) may include a snooper (121). In the example of FIG. 1, a snooper (121) is a module of automated computing machinery, such as a logic circuit, that monitors a communications path such a cache control bus for operations to be executed by other components on the communications path. The cache controller (110) of FIG. 1 also includes one or more snoop machines (120), which are modules of automated computing logic for executing instructions such as, for example, a token-required cache operation.

In the example of FIG. 1, the snooper (121) snoops an instruction to execute a token-required cache operation. In the example of FIG. 1, 'snooping' the instruction is carried out by listening to a communications path, such as the cache control bus (116), that carries the instruction to execute a token-required cache operation. The instruction may own a token that is needed to execute the token-required cache operation. Alternatively, the instruction may be a joint instruction that includes a request for a token and the token-required cache operation for execution. In the example of FIG. 1, a token indicates that a particular token-required cache operation is ripe for execution. Such a token may be embodied, for example, in a special purpose data structure and may be distributed by a token manager (212) that is a module of automated computing machinery for managing and distributing tokens. In the example of FIG. 1, a token manager (212) may distribute a single token to only one instruction to execute a token-required cache operation at a time. By distributing only a single token at any given time, the token manager (212) can ensure that only one instruction to execute a token-required cache operation is executed at a time, thereby preventing collisions and other undesirable consequences that may arise from executing multiple token-required cache operations simultaneously.

In the example of FIG. 1, the snooper (121) subsequently determines if the snoop machine (120) is available and also determines if the snoop machine (120) is set to a reservation state. In the example of FIG. 1, the reservation state indicates that the snoop machine (120) will dispatch the cache controller (110) only to handle token-required cache operations that own a token. In the example of FIG. 1, if the snoop machine (120) is available and the snoop machine (120) is also in the reservation state, the snooper (121) will determine whether the instruction to execute the token-required cache operation owns a token or is a joint instruction that include a request for a token and a token-required cache operation. If the instruction to execute the token-required cache operation does not own a token, the snoop machine (120) indicates that this token-required cache operation must retry. If the instruction to execute the token-required cache operation owns a token, however, the snoop machine (120) will dispatch the cache controller (110) to execute the token-required cache operation.

In the example of FIG. 1, the cache controller (110) determines whether all the cache controllers of a set (123) of relevant compute nodes are available to execute the instruction. In the example of FIG. 1, a compute node is relevant if the compute node includes snoopers and snoop machines that are ensuring forward progress of token-required cache operations in a shared cache according to embodiments of the present invention. In the example of FIG. 1, computes nodes (202, 204, 206, 208) are in the set (123) of relevant compute nodes while compute node (210) is outside of the set (123). As such, compute node (210) does not have any resources that are being used to ensure forward progress of token-required cache operations in a shared cache according to embodiments of the present application. In the example of FIG. 1, if the cache controllers of a set (123) of relevant compute nodes are available to execute the instruction, the cache controllers will execute the instruction. If the all the cache controllers of the set (123) of relevant compute nodes are not available to execute the instruction, however, the operation will be instructed to retry.

In the example of FIG. 1, at least one of the snoop machines may be a dedicated snoop machine that is configured to handle one or more types of token-required cache operations. A snoop machine is a dedicated snoop machine in the sense that the snoop machine only accepts token-required cache operations. A dedicated snoop machine therefore does not execute other cache operations, but instead only executes token-required cache operations. In the example of FIG. 1, however, at least one of the snoop machines may be a non-dedicated snoop machine that is configured to handle one or more types of token-required cache operations as well as one or more types of cache operations that do not require a token. A snoop machine is a non-dedicated snoop machine in the sense that the snoop machine not only accepts token-required cache operations but also accepts cache operations that do not require a token.

Figure 2:
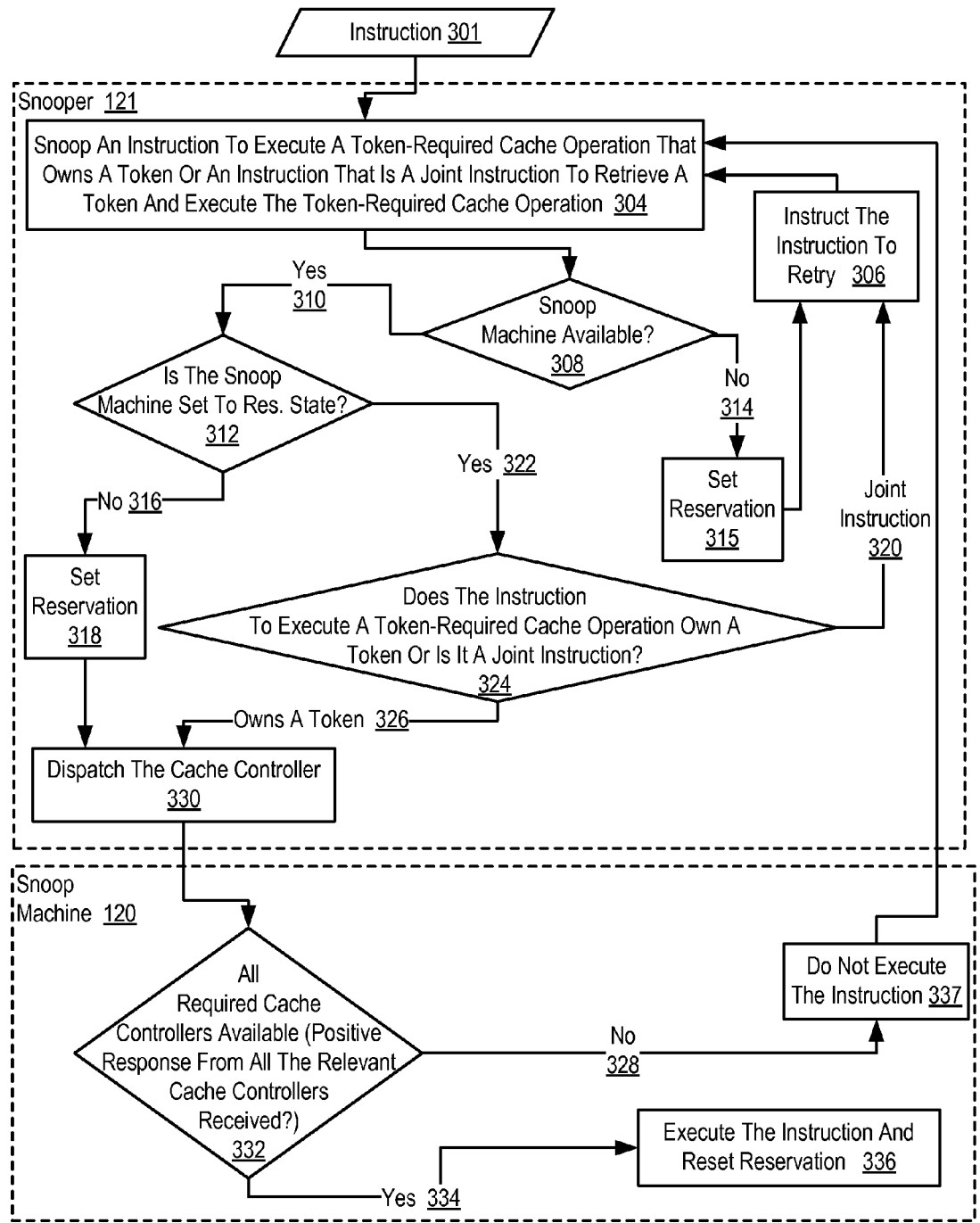
FIG. 2 sets forth a flow chart illustrating an example method for ensuring forward progress of token-required cache operations in a shared cache according to embodiments of the present invention.

For further explanation, FIG. 2 sets forth a flow chart illustrating an example method for ensuring forward progress of token-required cache operations in a shared cache according to embodiments of the present invention that includes snooping (304), by a snooper (121) in a cache controller in a shared cache level, an instruction (301) to execute a token-required cache operation. In the example of FIG. 2, a token-required cache operation is an operation that may only be executed when the operation owns a token. By requiring a token, only a single token-required cache operation is executed at one time, for example, by only allocating one token at a given time. Upon execution of the token-required cache operation, the token may be returned for distribution to another instruction (301) to execute a token-required cache operation. As such, instructions (301) to execute a token-required cache operation are carried out in two phases: a token acquisition phase and a command execution phase. In the example of FIG. 2, the instruction (301) may therefore be an instruction that owns a token that is required for the execution of the token-required cache operation. Alternatively, the instruction (301) may be a joint instruction that includes a request for a token and a token-required cache operation for execution.

In the example of FIG. 2, a snooper (121) in a cache controller in a shared cache level, snoops (304) an instruction (301) to execute a token-required cache operation. In the example of FIG. 2, a snooper (121) is a module of automated computing machinery, such as a logic circuit, that monitors a communications path such a cache control bus for operations to be executed by other components on the communications path. In the example of FIG. 2, snooping (304) an instruction (301) to execute a token-required cache operation may be carried out, for example, by monitoring a communications path, such as a cache control bus, upon which such instructions (301) are communicated.

The example of FIG. 2 includes determining (308), by the snooper (121), if a snoop machine is available. In the example of FIG. 2, a snoop machine is a module of automated computing logic for executing cache operations such as, for example, a token-required cache operation. In the example of FIG. 2, a snoop machine is deemed to be available if the snoop machine is not currently executing or prohibited from executing a cache operation. That is, the snoop machine is available in the sense the snoop machine is ready to process a cache operation that it may receive. In the example of FIG. 2, if the snoop machine is not (314) available, the snooper (121) may set (315) the snoop machine to the reservation state and, since the snoop machine (120) is not available, instruct the instruction to retry (306). Determining (308), by snooper (121), if the snoop machine is available may therefore be carried out by determining whether the snoop machine is currently executing a cache operation or prohibited from executing a cache operation.

In the example of FIG. 2, if the snoop machine is (310) available, the snooper (121) may determine (312) if the snoop machine is set to a reservation state. In the example of FIG. 2, the reservation state indicates that the snoop machine will dispatch the cache controller to handle only token-required cache operations that own a token. That is, the snoop machine is reserved in the sense that it is waiting for a token-required cache operation that already owns a token to execute. When the snoop machine is in the reserved state, the snoop machine is only available to token-required cache operations that already own a token and will not accept or execute any other cache operations. Determining (312) if the snoop machine is set to a reservation state may therefore be carried out, for example, by checking a reservation bit or other data structure indicating that the snoop machine is set to a reservation state.

In the example of FIG. 2, if the snoop machine is (310) available and the snoop machine is not (316) in the reservation state, the snoop machine is set (318) to the reservation state and the instruction is dispatched (330) to a cache controller. Because the instruction (301) to execute a token-required cache operation may be either: 1) an instruction that owns a token that is required for the execution of the token-required cache operation, or 2) a joint instruction that includes a request for a token and a token-required cache operation for execution, the snooper (121) can ascertain that in either case, a token-required cache operation has been issued. As such, the snoop machine is set (318) to the reservation state so that the snoop machine can execute the instruction that owns a token or execute the token-required cache operation in the joint instruction if a token is acquired for the token-required cache operation in the joint instruction. In the example of FIG. 2, setting (318) the snoop machine to the reservation state may be carried out, for example, by writing a value to a reservation bit or other data structure indicating that the snoop machine is set to the reservation state.

In the example of FIG. 2, if the snoop machine is (310) available and the snoop machine is (322) in the reservation state, the snooper (121) determines (324) whether the instruction (301) to execute a token-required cache operation owns a token or is a joint instruction. In the example of FIG. 2, if the instruction (301) to execute the token-required cache operation is a joint instruction (320), the instruction (301) is instructed (306) to retry. Because a joint instruction includes a request for a token and a token-required cache operation for execution, the joint instruction will ultimately be processed by a token manager such that the token manager will provide a token for use by the instruction (301). Until such a token is acquired, however, the snoop machine will not carry out the execution of the token-required cache operation that is included in the joint instruction while the snoop machine (120) is in the reserved state. As such, from the perspective of the snoop machine (120), the instruction (301) should be retried until a token is acquired so that the snoop machine (120) can execute the token-required cache operation contained in the joint instruction. In the example of FIG. 2, determining (324) whether the instruction (301) to execute a token-required cache operation owns a token or is a joint instruction may be carried out, for example, by examining the contents to the instruction (301) for a token.

In the example of FIG. 2, if the instruction (301) to execute the token-required cache operation is a joint instruction (320), the instruction is instructed (306) to retry. That is, until the joint operation acquires a token, at which point it is an operation that owns a token, the joint instruction is instructed (306) to retry while the snoop machine (121) is in the reserved state. In the example of FIG. 2, however, if the instruction (301) to execute the token-required cache operation owns a token (326), the cache controller that includes the snoop machine is dispatched (330) to execute the token-required cache operation. In the example of FIG. 2, the snoop machine is now available, the snoop machine is now reserved, and the instruction (301) owns a token required to execute the token-required cache operation. As such, the snoop machine is now capable of executing the token-required cache operation.

The example of FIG. 2 also includes determining (332), by the cache controller, whether all required cache controllers of the relevant compute nodes are available to execute the instruction. In the example of FIG. 2, a compute node is relevant if the compute node includes snoopers and snoop machines that are ensuring forward progress of token-required cache operations in a shared cache according to embodiments of the present invention.

In the example of FIG. 2, if all required cache controllers of the relevant compute nodes are available (334) to execute the instruction, the instruction (301) is executed (336) and the reservation state of the snoop machines is reset so that the snoop machines are now available to all commands. In the example of FIG. 2, determining (332) whether all required cache controllers of the relevant compute nodes are available to execute the instruction may be carried out, for example, by broadcasting a cache operation request to the other cache controllers and getting a good combined response. In the example of FIG. 2, if only two cache controllers are relevant, determining (332) whether all required cache controllers of the relevant compute nodes are available to execute the instruction may be carried out, for example, by sending the cache operation request for a point-to-point message and getting a good response from the sender and the recipient.

The example of FIG. 2 also includes not (337) executing the instruction if all required cache controllers of the relevant compute nodes are not (328) available to execute the instruction (301). In the example of FIG. 2, not (337) executing the instruction if all required cache controllers of the relevant compute nodes are not (328) available to execute the instruction (301) may be carried out, for example, by freeing up the dispatched system resources, by placing the instruction (301) back onto a communications path such as a cache control bus, by sending an instruction to a system administrator indicating that the instruction was not executed, and so on.

In the example of FIG. 2, the relevant compute nodes are configurable. As explained above, a compute node is relevant if the compute node includes snoopers and snoop machines that are ensuring forward progress of token-required cache operations in a shared cache according to embodiments of the present invention. The set of relevant compute nodes is configurable in the sense that a particular compute node can be excluded from participating in ensuring forward progress of token-required cache operations in a shared cache according to embodiments of the present invention and a particular compute node may similarly be included in ensuring forward progress of token-required cache operations in a shared cache according to embodiments of the present invention. As such, the set of compute nodes that are participating in ensuring forward progress of token-required cache operations in a shared cache, by having snoopers and snoop machine carry out the steps described herein, may be modified to add a particular compute node to the set of relevant compute nodes or modified to remove a particular compute node from the set of relevant compute nodes.

In the example of FIG. 2, the snoop machines are also configurable. As explained above, a snoop machine is a module of automated computing logic for executing cache operations. Each snoop machine is configurable in the sense that a particular cache machine can be configured to execute token-required cache operations or configured such that a particular snoop machine will not accept token-required cache operations. As such, even if a particular snoop machine resides on a compute node in the relevant set of compute nodes—those nodes that participate in ensuring forward progress of token-required cache operations in a shared cache—the snoop machine itself may not accept token-required cache operations. Since each compute node may have multiple snoop machines, the snoop machine may be configured such that only a particular subset of the snoop machines accepts token-required cache operations. Likewise, at least one of the snoop machines may be a dedicated snoop machine configured to handle one or more types of token-required cache operations. A snoop machine is a dedicated snoop machine in the sense that the snoop machine only accepts token-required cache operations. A dedicated snoop machine therefore does not execute other cache operations, but instead, only executes token-required cache operations.

In the example of FIG. 2, if the snoop machine is (310) available and if the snoop machine is not (316) set to a reservation state, the snoop machine is set (318) to the reservation state and the cache controller that includes the snoop machine is dispatched (330) to execute the token-required cache operation. In the example of FIG. 2, determining (332) whether all required cache controllers of relevant compute nodes are available to execute the instruction includes receiving a positive response from all the relevant cache controllers, including the token manager, which indicates, by a positive response, that the token-required cache operation owns a token. In the example of FIG. 2, a positive response (334) indicates that the cache controllers are available. Such a positive response may be embodied, as a combined response, as responses from each cache controller, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of ensuring forward progress of token-based cache operations in a shared cache, the method comprising:
    snooping, by a snooper in a cache controller in a shared cache level, an instruction to execute a token-required cache operation that owns a token or an instruction that is a joint instruction that includes a request for a token and the token-required cache operation for execution;
    determining, by the snooper, if a snoop machine is available and if the snoop machine is set to a reservation state, wherein the reservation state indicates that the snoop machine will dispatch the cache controller to handle only token-required cache operations that include a token;
    if the snoop machine is available and the snoop machine is in the reservation state, determining whether the instruction to execute the token-required cache operation includes a token or is a joint instruction;
    if the instruction is a joint instruction, instructing the instruction to retry;
    if the instruction to execute the token-required cache operation includes a token, dispatching the cache controller that includes the snoop machine to execute the token-required cache operation;
    determining, by the cache controller, whether all required cache controllers of relevant compute nodes are available to execute the instruction and executing the instruction if the required cache controllers are available; and
    if all required cache controllers of the relevant compute nodes are not available to execute the instruction, not executing the instruction.

2. The method of claim 1 wherein the relevant compute nodes are configurable.

3. The method of claim 1 wherein the snoop machines are configurable.

4. The method of claim 1 wherein at least one of the snoop machines is a dedicate snoop machine.

5. The method of claim 1 further comprising responsive to snooping, by a snooper in a cache controller in a shared cache level, an instruction to execute token-required cache operation that includes a token or an instruction that is a joint instruction that includes a request for a token and a token-required cache operation for execution:
    determining, by the snoop machine, if the snoop machine is available and if the snoop machine is set to a reservation state; and
    if the snoop machine is available and the snoop machine is not in the reservation state, setting the snoop machine to the reservation state.

6. The method of claim 1 further comprising responsive to snooping, by a snooper in a cache controller in a shared cache level, an instruction to execute token-required cache operation that includes a token or an instruction that is a joint instruction that includes a request for a token and a token-required cache operation for execution:
- determining, by the snoop machine, if the snoop machine is available and if the snoop machine is set to a reservation state; and
- if the snoop machine is not available, setting the snoop machine to the reservation state.

7. The method of claim 1 further comprising responsive to snooping, by a snooper in a cache controller in a shared cache level, an instruction to execute token-required cache operation that includes a token or an instruction that is a joint instruction that includes a request for a token and a token-required cache operation for execution:
- determining, by the snoop machine, if the snoop machine is available and if the snoop machine is set to a reservation state; and
- if the snoop machine is not available, responding with a retry instruction.

8. The method of claim 1 further comprising responsive to snooping, by a snooper in a cache controller in a shared cache level, an instruction to execute token-required cache operation that includes a token or an instruction that is a joint instruction that includes a request for a token and a token-required cache operation for execution:
- determining, by the snoop machine, if the snoop machine is available and if the snoop machine is set to a reservation state; and
- if the snoop machine is available and the snoop machine is not in the reservation state, dispatching the cache controller that includes the snoop machine to execute the token-required cache operation whether it includes a token or is a joint instruction.

9. The method of claim 1 wherein determining whether all required cache controllers of relevant compute nodes are available are available to execute the instruction further comprises receiving a positive response from all the relevant cache controllers.

10. Apparatus for ensuring forward progress of token-based cache operations in a shared cache, the apparatus comprising a computer processor, a computer memory operatively coupled to the computer processor, the computer memory having disposed within it computer program instructions that, when executed by the computer processor, cause the apparatus to carry out the steps of:
- snooping, by a snooper in a cache controller in a shared cache level, an instruction to execute a token-required cache operation that owns a token or an instruction that is a joint instruction that includes a request for a token and the token-required cache operation for execution;
- determining, by the snooper, if a snoop machine is available and if the snoop machine is set to a reservation state, wherein the reservation state indicates that the snoop machine will dispatch the cache controller to handle only token-required cache operations that include a token;
- if the snoop machine is available and the snoop machine is in the reservation state, determining whether the instruction to execute the token-required cache operation includes a token or is a joint instruction;
- if the instruction is a joint instruction, instructing the operation to retry;
- if the instruction to execute the token-required cache operation includes a token, dispatching the cache controller that includes the snoop machine to execute the token-required cache operation;
- determining, by the cache controller whether all required cache controllers of relevant compute nodes are available to execute the instruction and executing the instruction if the required cache controllers are available; and
- if all required cache controllers of the relevant compute nodes are not available to execute the instruction, not executing the instruction.

11. The apparatus of claim 10 wherein the relevant compute nodes are configurable.

12. The apparatus of claim 10 wherein the snoop machines are configurable.

13. The apparatus of claim 10 wherein at least one of the snoop machines is a dedicate snoop machine.

14. The apparatus of claim 10 further comprising computer program instructions that, when executed by the computer processor, cause the apparatus to, responsive to snooping, by a snoop machine of a set of snoop machines of a plurality of cache controllers in a shared cache level, an instruction to execute token-required cache operation that includes a token or an instruction that is a joint instruction that includes a request for a token and a token-required cache operation for execution, carry out the steps of:
- determining, by the snoop machine, if the snoop machine is available and if the snoop machine is set to a reservation state; and
- if the snoop machine is available and the snoop machine is not in the reservation state, setting the snoop machine to the reservation state.

15. The apparatus of claim 10 further comprising computer program instructions that, when executed by the computer processor, cause the apparatus to, responsive to snooping, by a snoop machine of a set of snoop machines of a plurality of cache controllers in a shared cache level, an instruction to execute token-required cache operation that includes a token or an instruction that is a joint instruction that includes a request for a token and a token-required cache operation for execution, carry out the steps of:
- determining, by the snoop machine, if the snoop machine is available and if the snoop machine is set to a reservation state; and
- if the snoop machine is not available, setting the snoop machine to the reservation state.

16. The apparatus of claim 10 further comprising computer program instructions that, when executed by the computer processor, cause the apparatus to, responsive to snooping, by a snoop machine of a set of snoop machines of a plurality of cache controllers in a shared cache level, an instruction to execute token-required cache operation that includes a token or an instruction that is a joint instruction that includes a request for a token and a token-required cache operation for execution, carry out the step of:
- determining, by the snoop machine, if the snoop machine is available and if the snoop machine is set to a reservation state; and
- if the snoop machine is not available, responding with a retry instruction.

17. The apparatus of claim 10 further comprising computer program instructions that, when executed by the computer processor, cause the apparatus to, responsive to snooping, by a snoop machine of a set of snoop machines of a plurality of cache controllers in a shared cache level, an instruction to execute token-required cache operation that includes a token or an instruction that is a joint instruction that includes a request for a token and a token-required cache operation for execution, carry out the step of:

determining, by the snoop machine, if the snoop machine is available and if the snoop machine is set to a reservation state; and if the snoop machine is available and the snoop machine is not in the reservation state, dispatching the cache controller that includes the snoop machine to execute the token-required cache operation whether it includes a token or is a joint instruction.

18. The apparatus of claim 10 wherein determining whether all the cache controllers of relevant compute nodes are available to execute the instruction further comprises receiving a positive response from all the relevant cache controllers.

19. A computer program product for ensuring forward progress of token-based cache operations in a shared cache, the computer program product disposed upon a computer readable storage medium, wherein the computer readable storage medium is not a signal, the computer program product comprising computer program instructions that, when executed, cause a computer to carry out the steps of:

snooping, by a snooper in a cache controller in a shared cache level, an instruction to execute a token-required cache operation that owns a token or an instruction that is a joint instruction that includes a request for a token and the token-required cache operation for execution;

determining, by the snooper, if a snoop machine is available and if the snoop machine is set to a reservation state, wherein the reservation state indicates that the snoop machine will dispatch the cache controller to handle only token-required cache operations that include a token;

if the snoop machine is available and the snoop machine is in the reservation state, determining whether the instruction to execute the token-required cache operation includes a token or is a joint instruction;

if the instruction is a joint instruction, instructing the operation to retry;

if the instruction to execute the token-required cache operation includes a token, dispatching the cache controller that includes the snoop machine to execute the token-required cache operation;

determining, by the cache controller whether all required cache controllers of relevant compute nodes are available to execute the instruction and executing the instruction if the required cache controllers are available; and if all required cache controllers of the relevant compute nodes are not available to execute the instruction, not executing the instruction.

20. The computer program product of claim 19 wherein the set of snoop machines are configurable.

21. The computer program product of claim 19 wherein the snoop machines are configurable.

22. The computer program product of claim 19 wherein at least one of the snoop machines is a dedicate snoop machine.

23. The computer program product of claim 19 further comprising computer program instructions that, when executed, cause a computer, responsive to snooping, by a snooper in a cache controller in a shared cache level, an instruction to execute token-required cache operation that includes a token or an instruction that is a joint instruction that includes a request for a token and a token-required cache operation for execution, to carry out the step of:

determining, by the snoop machine, if the snoop machine is available and if the snoop machine is set to a reservation state; and if the snoop machine is available and the snoop machine is not in the reservation state, setting the snoop machine to the reservation state.

24. The computer program product of claim 19 further comprising computer program instructions that, when executed, cause a computer, responsive to snooping, by a snooper in a cache controller in a shared cache level, an instruction to execute token-required cache operation that includes a token or an instruction that is a joint instruction that includes a request for a token and a token-required cache operation for execution, to carry out the steps of:

determining, by the snoop machine, if the snoop machine is available and if the snoop machine is set to a reservation state; and if the snoop machine is not available, setting the snoop machine to the reservation state.

25. The computer program product of claim 19 further comprising computer program instructions that, when executed, cause a computer, responsive to snooping, by a snooper in a cache controller in a shared cache level, an instruction to execute token-required cache operation that includes a token or an instruction that is a joint instruction that includes a request for a token and a token-required cache operation for execution, to carry out the steps of:

determining, by the snoop machine, if the snoop machine is available and if the snoop machine is set to a reservation state; and if the snoop machine is not available, responding with a retry instruction.

26. The computer program product of claim 19 further comprising computer program instructions that, when executed, cause a computer, responsive to snooping, by a snooper in a cache controller in a shared cache level, an instruction to execute token-required cache operation that includes a token or an instruction that is a joint instruction that includes a request for a token and a token-required cache operation for execution, to carry out the steps of:

determining, by the snoop machine, if the snoop machine is available and if the snoop machine is set to a reservation state; and if the snoop machine is available and the snoop machine is not in the reservation state, dispatching the cache controller that includes the snoop machine to execute the token-required cache operation whether it includes a token or is a joint instruction.

27. The computer program product of claim 19 wherein determining whether all the cache controllers of relevant compute nodes are available to execute the instruction further comprises receiving a positive response from all the relevant cache controllers.

\* \* \* \* \*